US008266975B2

(12) United States Patent
Sip et al.

(10) Patent No.: US 8,266,975 B2
(45) Date of Patent: Sep. 18, 2012

(54) ROTATION DEVICE AND ELECTRONIC ASSEMBLY UTILIZING THE SAME

(75) Inventors: Kim-Yeung Sip, Shenzhen (CN); Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 510 days.

(21) Appl. No.: 12/649,332

(22) Filed: Dec. 30, 2009

(65) Prior Publication Data
US 2011/0094326 A1 Apr. 28, 2011

(30) Foreign Application Priority Data
Oct. 22, 2009 (CN) .......................... 2009 1 0308634

(51) Int. Cl.
*F16H 3/00* (2006.01)
(52) U.S. Cl. ..................... 74/89.23; 74/89.11; 74/89.19; 74/142
(58) Field of Classification Search .................. 74/89.23, 74/89.34, 490.01, 490.03, 490.08, 490.09, 74/108
See application file for complete search history.

(56) References Cited

U.S. PATENT DOCUMENTS

| 5,806,244 | A  | * | 9/1998  | Tilli .............................. 49/358 |
| 7,357,048 | B2 | * | 4/2008  | Hartig et al. ............... 74/424.83 |
| 2006/0101931 | A1 | * | 5/2006  | Zimmermann .............. 74/89.23 |
| 2006/0207359 | A1 | * | 9/2006  | Kowalski ..................... 74/89.23 |
| 2009/0277292 | A1 | * | 11/2009 | Quarre et al. ................ 74/89.23 |
| 2011/0000328 | A1 | * | 1/2011  | Oberle et al. ............... 74/89.23 |
| 2011/0041632 | A1 | * | 2/2011  | Baker et al. .................. 74/89.23 |
| 2011/0100145 | A1 | * | 5/2011  | Feng .......................... 74/490.01 |
| 2012/0103115 | A1 | * | 5/2012  | Wu et al. ..................... 74/89.23 |
| 2012/0131826 | A1 | * | 5/2012  | Dai ................................ 40/597 |

* cited by examiner

*Primary Examiner* — J. Allen Shriver, II
*Assistant Examiner* — Zakaria Elahmadi
(74) *Attorney, Agent, or Firm* — Altis Law Group, Inc.

(57) ABSTRACT

An electronic assembly comprises a rotation device comprising a fixed platform defining a through hole. An annular groove is formed in the inside wall of the fixed platform. A first transmission element seats a plurality of teeth. A second transmission element is located in the through hole, and comprises a threaded axis portion and a toothed portion meshing with the plurality of teeth. A third transmission element comprises a rotation portion rotatably mounted in the interior of the annular groove of the fixed platform. A threaded hole is defined in the rotation portion, and is configured for cooperating with the threaded axis portion. A driver source is fixed on the fixed platform and is configured for rotating the first transmission element. An electronic device is mounted on the third transmission element.

16 Claims, 3 Drawing Sheets

ROTATION DEVICE AND ELECTRONIC ASSEMBLY UTILIZING THE SAME

BACKGROUND

1. Technical Field

The present disclosure relates to a rotation device and an electronic assembly utilizing the same.

2. Description of Related Art

Electronic assemblies are often rotated to a specific angle for convenient use. However, it can be time consuming and inefficient to always rotate the assembly to the desired angle.

Therefore, what is needed is an electronic assembly to overcome the imitations described above.

DETAILED DESCRIPTION

Figure 1:
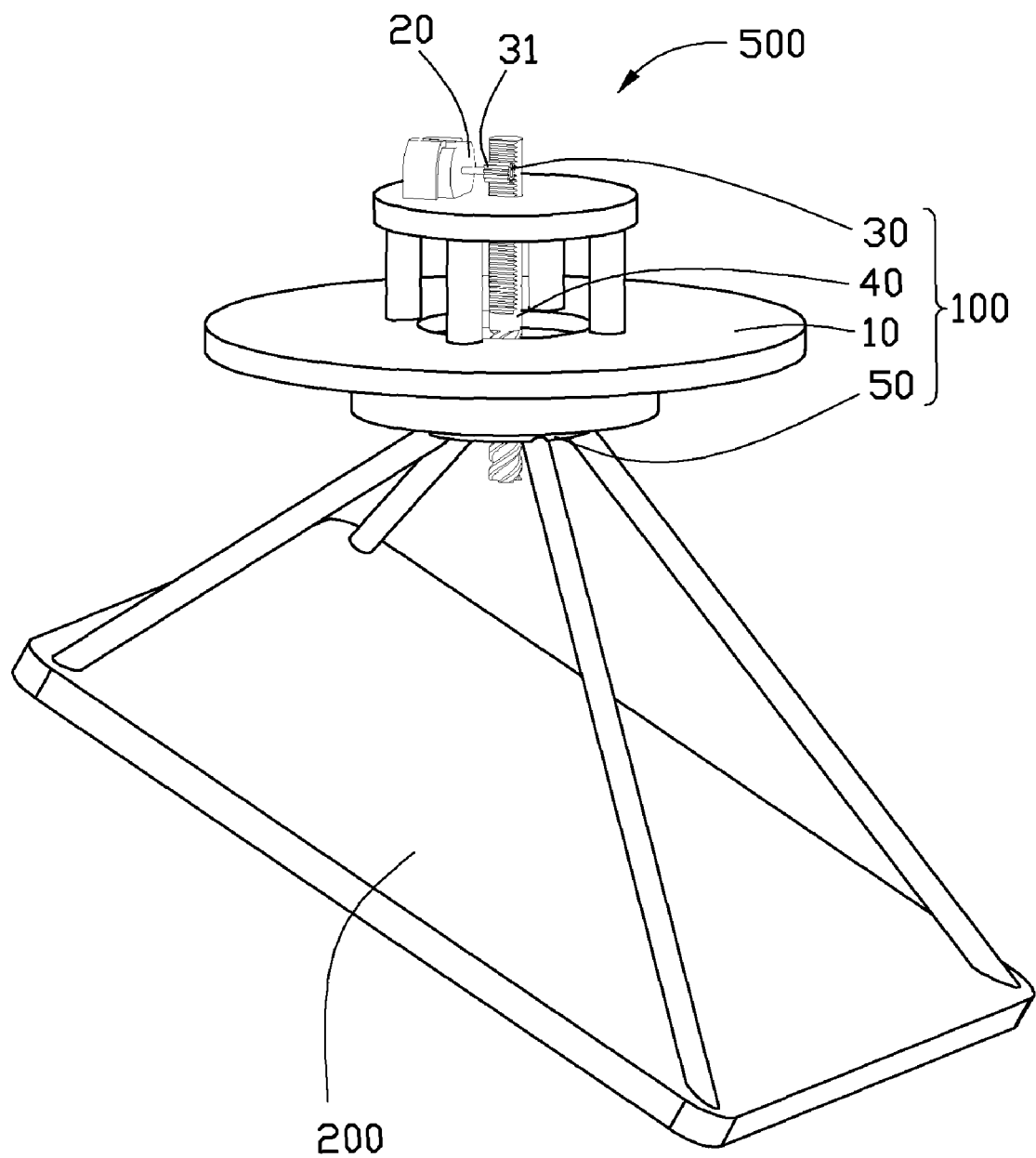
FIG. 1 is an isometric view of an electronic assembly in accordance with an exemplary embodiment.

Referring to FIG. 1, an electronic assembly 500 is provided. The electronic assembly 500 includes a rotation device 100 and an electronic device 200 mounted thereon. The rotation device 100 is configured for rotating the electronic device 200.

The rotation device 100 includes a fixed platform 10, a driver source 20 mounted thereon, a first transmission element 30, a second transmission element 40, and a third transmission element 50 rotatably mounted on the fixed platform 10.

Figure 2:
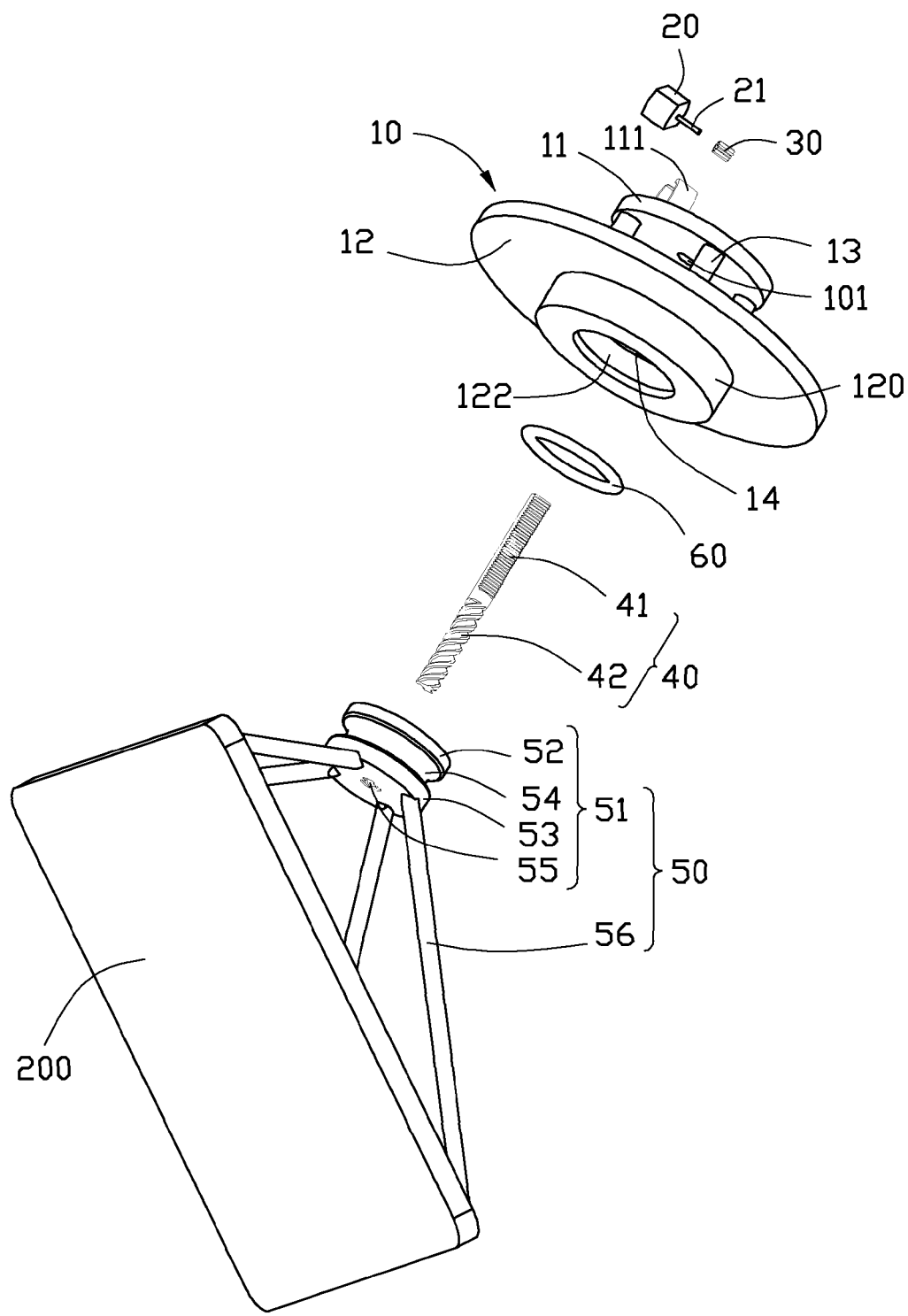
FIG. 2 is an exploded view of the electronic assembly of FIG. 1.
Figure 3:
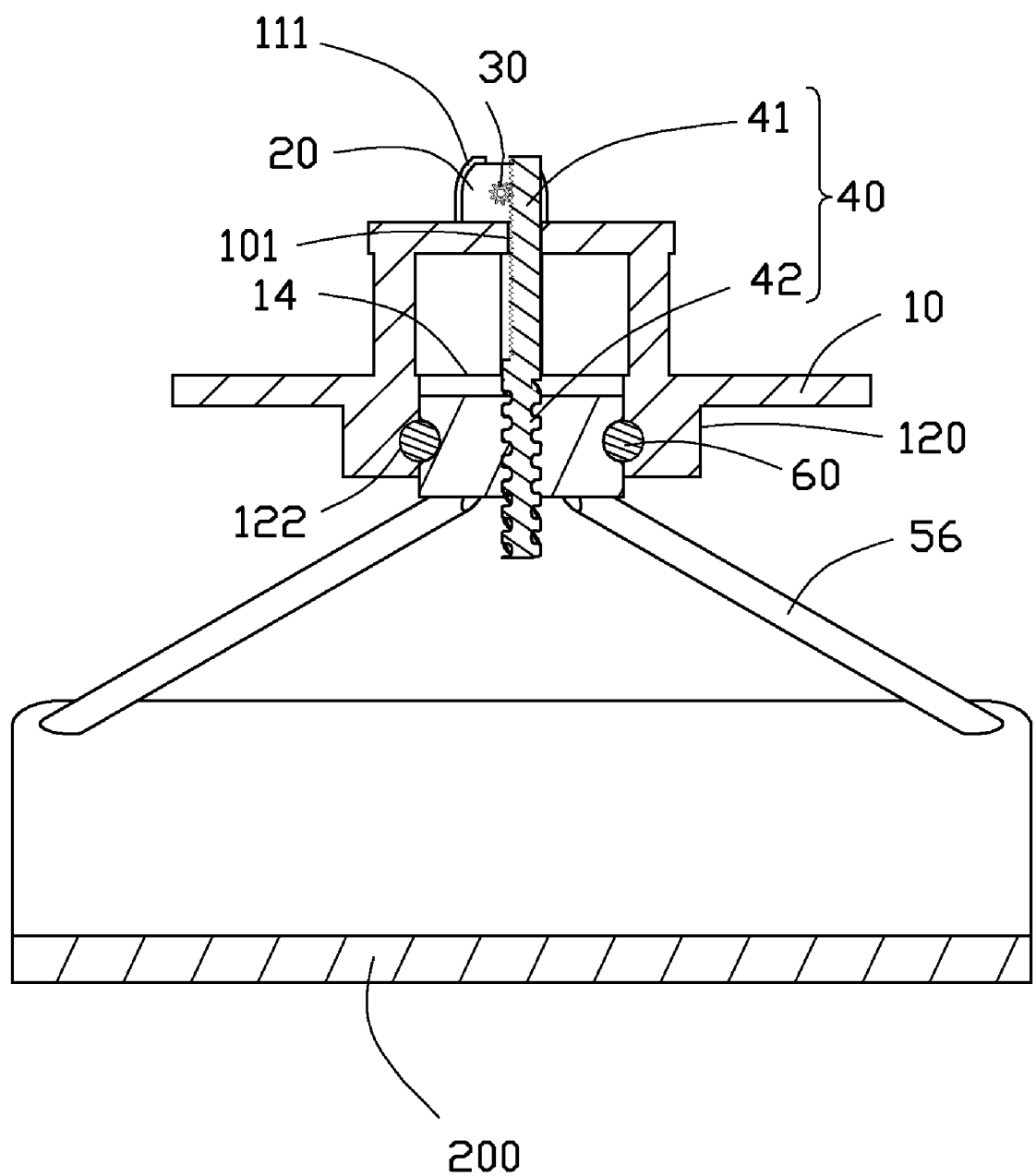
FIG. 3 is a cross-section of the electronic assembly of FIG. 1, taken along the line III-III.

Referring to FIGS. 2-3, the fixed platform 10 includes an upper portion 11, a lower portion 12 parallel to the upper portion 11, and a support portion 13. The upper portion 11 is fixed to the lower portion 12 by the support portion 13. In the exemplary embodiment, the upper portion 11 and the lower portion 12 are circular and flat. A semicircular area of the upper portion 11 is less than that of the lower portion 12. A protrusion platform 120 extends from the lower portion 12 away from the upper portion 11. The upper portion 11 includes two fixed arms 111, between which the driver source 20 is fixed (as shown in FIG. 1). A first through hole 101 is defined in the middle of the upper portion 11, and a second through hole 14 is defined in the middle of the lower portion 12. The first through hole 101 aligns with the second through hole 14. The inner diameter of the first through hole 101 is less than that of the second through hole 14. The inside wall of the protrusion platform 120 is curved towards the interior to form an annular groove 122. An inner diameter of the annular groove 122 exceeds that of the second through hole 14.

The driver source 20 includes an output axis 21. The first transmission element 30 is placed over the output axis 21, and rotates following the driver source 20. A plurality of teeth 31 is situated along the circumferential surface of the first transmission element 30.

The second transmission element 40 is a longitudinal bar and includes a toothed portion 41 and a threaded axis portion 42. The second transmission element 40 is located in the first through hole 101 and the second through hole 14, the toothed portion 41 extends through the first through hole 101, and meshes with the teeth 31 of the first transmission element 30, such that when the first transmission element 30 is rotated by the driver source 20, the second transmission element 40 moves in the second through hole 14.

The third transmission element 50 includes a rotation portion 51. The rotation portion 51 is substantially a circular plate, and includes an upper flange 52 and a lower flange 53 symmetrical to the upper flange 52. The upper flange 52 and the lower flange 53 intersect to form a neck portion 54. The diameter of the upper flange 52 and the lower flange 53 exceeds that of the neck portion 54, and is less than that of the second through hole 14. The rotation portion 51 further includes a threaded hole 55, which extends from the upper flange 52 to the lower flange 53. The threaded hole 55 is configured for cooperating with the threaded axis portion 42.

The third transmission element 50 further includes a plurality of support poles 56. In the exemplary embodiment, the number of support poles 56 is four. One end of each of the support poles 56 is fixed to the lower flange 53. Another end of each of the support poles 56 is connected to the electronic device 200, and configured for supporting the electronic device 200.

The rotation device 100 further includes a ring portion 60. The ring portion 60 is an elastic element with a nap. When the ring portion 60 is in a natural state, an outer diameter of the ring portion 60 exceeds the inner diameter of the second through hole 14, and is less than or is equal to the inner diameter of the annular groove 122. When the ring portion 60 is compressed, the outer diameter of the ring portion 60 is less than the inner diameter of the second through hole 14.

During assembly, the ring portion 60 is placed over the neck portion 54, and is compressed toward the interior reduces the outer diameter of the ring portion 60 to less than the inner diameter of the second through hole 14, so that, the ring portion 60 is received in the annular groove 122. The third transmission element 50 is received in the second through hole 14 until ring portion 60 is embedded in the annular groove 122. After the ring portion 60 is received in the annular groove 122, the elasticity of the ring portion 60 recovers; and the outer diameter of the ring portion 60 gradually enlarges to engage the annular groove 122, such that the third transmission element 50 is rotatably mounted on the fixed platform 10.

During operation of the rotation device 100, the driver source 20 rotates the first transmission element 30, and the teeth of the first transmission element 30 drive the toothed portion 41 of the second transmission element 40 to move along the axis of the second through hole 14. Because the threaded axis portion 42 of the second transmission element 40 cooperates with the threaded hole 55 of the third transmission element 50, and the third transmission element 50 is mounted on the annular groove 122 of the fixed platform 10, when the second transmission element 40 moves in the second through hole 14, the third transmission element 50 and the electronic device 200 rotate relative to the fixed platform 10 by a rotating force generated by the moving threaded axis portion 42 such that the electronic device 200 rotates to an appropriate angle. Because the driver source 20 has precise rotation, electronic device 200 can be rotated exactly.

In another embodiment, the rotation portion 51 of the third transmission element 50 does not include the lower flange 53, such that the outer diameter of the rotation portion 51 exceeds the inner diameter of the second through hole 14, and is equal to or less than the inner diameter of the annular groove 122. During assembly, the third transmission element 50 is exposed to a cooling gas, and shrinks during the cooling process. Accordingly, the outer diameter of the rotation portion 51 is less than the inner diameter of the second through hole 14. The rotation portion 51 of the third transmission element 50 is received in the annular groove 122 of the second through hole 14 of the fixed platform 10. When the third transmission element 50 recovers its original shape, the rotation portion 51 adapts to the size of the annular groove 122, thus, the third transmission element 50 is mounted on the fixed platform 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic assembly comprising:
   a rotation device comprising:
   a fixed platform defining a through hole, and an annular groove formed in the inside wall of the through hole of the fixed platform;
   a first transmission element defining a plurality of teeth;
   a second transmission element received in the through hole and comprising a threaded axis portion and a toothed portion meshing with the plurality of teeth;
   an elastic member;
   a third transmission element comprising a rotation portion rotatably mounted in the through hole of the fixed platform and engaged with the annular groove of the fixed platform via the elastic member, and a threaded hole being defined in the rotation portion, and configured for cooperating with the threaded axis portion;
   a driver source fixed on the fixed platform and configured for rotating the first transmission element; and
   an electronic device mounted on the third transmission element.

2. The electronic assembly as described in claim 1, wherein the driver source comprises an output axis over which the first transmission element is placed.

3. The electronic assembly as described in claim 1, wherein the third transmission element further comprises a support pole connecting to the rotation device, on which the electronic device is mounted.

4. The electronic assembly as described in claim 1, wherein the fixed platform comprises an upper portion, a lower portion parallel to the upper portion, and a support portion, and the upper portion is fixed to the lower portion by the support portion.

5. The electronic assembly as described in claim 4, wherein a protrusion platform extends from the lower portion away from the upper portion, and the inside wall of the protrusion platform is curved towards the interior to form the annular groove.

6. The electronic assembly as described in claim 4, wherein a first through hole is defined in the middle of the upper portion, and a second through hole is defined in the middle of the lower portion, the first through hole aligns with the second through hole to from the through hole.

7. The electronic assembly as described in claim 6, wherein the inner diameter of the first through hole is less than that of the second through hole.

8. The electronic assembly as described in claim 1, wherein the rotation portion further comprises an upper flange and a lower flange, the upper flange and the lower flange intersect to form a neck portion, and the upper flange and the lower flange are disposed in the interior of the through hole, and the threaded hole extends from the upper flange to the lower flange.

9. The rotation device as described in claim 8, wherein the rotation portion further comprises an elastic ring portion placed over the neck portion and situated in the interior of the annular groove.

10. A rotation device comprising:
    a fixed platform defining a through hole, with an annular groove formed in the inside wall of the through hole of the fixed platform;
    a first transmission element defining a plurality of teeth;
    a second transmission element located in the through hole, and comprising a threaded axis portion and a toothed portion engaging the plurality of teeth;
    an elastic member;
    a third transmission element comprising a rotation portion rotatably mounted in the through hole of the fixed platform and engaged with the annular groove of the fixed platform via the elastic member, and a threaded hole being defined in the rotation portion and configured for cooperating with the threaded axis portion; and
    a driver source fixed on the fixed platform and configured for rotating the first transmission element.

11. The rotation device as described in claim 10, wherein the rotation portion further comprises an upper flange and a lower flange, the upper flange and the lower flange intersect to form a neck portion, and the upper flange and the lower flange are disposed in the interior of the through hole, and the threaded hole extends from the upper flange to the lower flange.

12. The rotation device as described in claim 11, wherein the rotation portion further comprises an elastic ring portion placed over the neck portion and situated in the interior of the annular groove.

13. The rotation device as described in claim 10, wherein the outer diameter of the third transmission element is less than the inner diameter of the annular groove, and exceeds the inside of the through hole, and the rotation portion is mounted on the interior of the annular groove by cooling manner.

14. The rotation device as described in claim 10, wherein the upper portion comprises two fixed arms, between which the driver source is fixed.

15. The rotation device as described in claim 10, wherein the driver source comprises an output axis over which the first transmission element is placed.

16. The rotation device as described in claim 10, wherein the third transmission element further comprises a support pole connecting to the rotation device, on which the electronic device is mounted.

* * * * *